United States Patent
Parsons et al.

[11] Patent Number: 6,127,671
[45] Date of Patent: Oct. 3, 2000

[54] DIRECTIONAL OBJECT SENSOR FOR AUTOMATIC FLOW CONTROLLER

[75] Inventors: Natan E. Parsons, Brookline; Haiou Wu, Jamaica Plain, both of Mass.

[73] Assignee: Arichell Technologies, Inc., West Newton, Mass.

[21] Appl. No.: 09/085,740

[22] Filed: May 28, 1998

[51] Int. Cl.[7] .............................. G01S 17/02; G01S 7/481; E03C 1/05
[52] U.S. Cl. ............................ 250/221; 250/338.1; 4/623
[58] Field of Search .................. 250/221, 222.1, 250/338.1, 338.4, 339.06; 4/623, 668, 304, 313

[56] References Cited

U.S. PATENT DOCUMENTS

| | | | |
|---|---|---|---|
| 4,207,466 | 6/1980 | Drage et al. | 250/338 |
| 4,823,414 | 4/1989 | Piersimoni et al. | 4/623 |
| 4,894,874 | 1/1990 | Wilson | 4/623 |
| 4,941,219 | 7/1990 | Van Marcke | 4/623 |
| 4,998,673 | 3/1991 | Pilolla | 239/67 |
| 5,025,516 | 6/1991 | Wilson | 4/623 |
| 5,074,520 | 12/1991 | Lee et al. | 251/40 |
| 5,169,118 | 12/1992 | Whiteside | 251/30.03 |
| 5,412,816 | 5/1995 | Paterson et al. | 4/623 |
| 5,455,971 | 10/1995 | Sakakibara et al. | 4/313 |
| 5,539,198 | 7/1996 | McMichael et al. | 250/221 |
| 5,548,119 | 8/1996 | Nortier | 250/341.1 |
| 5,555,912 | 9/1996 | Saadi et al. | 137/801 |
| 5,566,702 | 10/1996 | Phillip | 137/1 |
| 5,668,366 | 9/1997 | Mauerhofer | 250/221 |
| 5,984,262 | 11/1999 | Parsons et al. | 4/623 |

*Primary Examiner*—John R. Lee
*Attorney, Agent, or Firm*—Cesari and McKenna, LLP

[57] ABSTRACT

In response to a infrared-radiation sensor assembly (12), a control circuit controls an electromechanical valve (18) in an automatic faucet (16). Reflector surfaces (44, 46) so form a sensor beam as to cause the sensor to be insensitive to the presence of a sink (24). The ratio of the resultant radiation pattern's horizontal extent to its vertical extent is greater than it would be in the absence of the reflector surfaces (44, 46). The control circuit is battery-powered, and the electromechanical valve (18) is of the latching variety so as to conserve the battery's energy.

30 Claims, 8 Drawing Sheets

DIRECTIONAL OBJECT SENSOR FOR AUTOMATIC FLOW CONTROLLER

BACKGROUND OF THE INVENTION

The present invention is directed to object-sensor-based automatic flow controllers. It applies particularly to optical-radiation emitters and sensors used in such controllers.

Object-sensor-based automatic flow controllers, such as automatic faucets, control fluid flow in response to object detection within a target region. Such systems work best if the object sensor is reasonably discriminating. While an automatic faucet should respond to a user's hands, for instance, it should not respond to the sink at which the faucet is mounted. Among the ways of making the system discriminate between the two is to limit the target region in such a manner as to exclude the sink's location.

One way to make the target region exclude the sink's location is to mount the sensor circuitry's optical-radiation emitter and receiver on the faucet spout near its outlet. Then the emitter power and/or receiver sensitivity can be so limited as to restrict the sensor's range to less than the outlet-to-sink distance. But it is sometimes considered undesirable esthetically or for other reasons to mount the emitter and receiver near the end of the spout. In such cases, discrimination by range alone is often impractical, because the emitter and receiver must ordinarily be mounted at a distance from the spout that is comparable to their distance from a sink surface to be excluded. So the beam width of the emitter and/or receiver is so limited as to exclude the unwanted target.

Although this approach can yield a serviceable system, the resultant position sensitivity usually makes it less convenient: the user must often make an effort to position his hands properly. Also, the lenses conventionally used to limit beam width exact a cost penalty.

SUMMARY OF THE INVENTION

We have reduced these problems by simply forming an asymmetrical beam. By making the beam's horizontal extent significantly greater than its vertical extent, one can exclude the sink with a minimum of undesirable object-position sensitivity. This result can be enhanced by tilting the beam upward. Furthermore, we have recognized that the cost of so limiting the beam's angular extent can be reduced greatly by using simple reflectors rather than lenses to form the beam.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
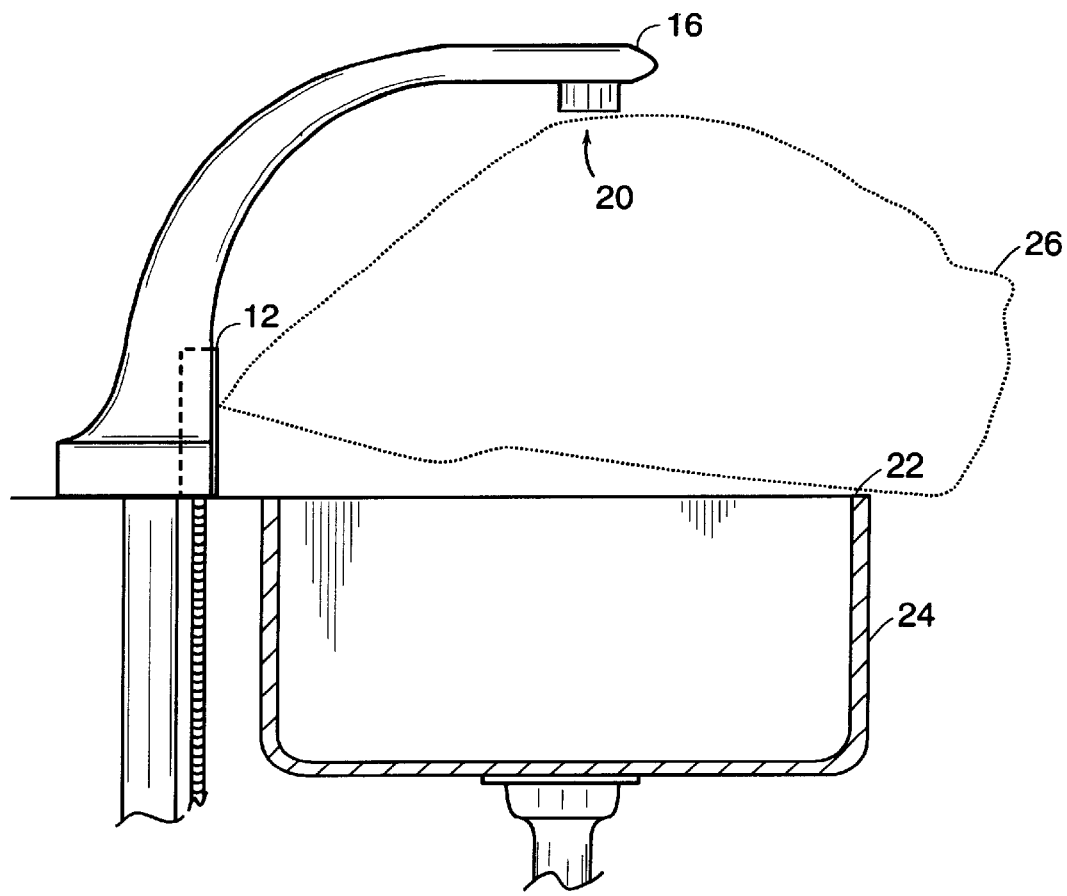
FIG. 1 is a side elevational view of an automatic-faucet system that employs the present invention's teachings.
Figure 2:
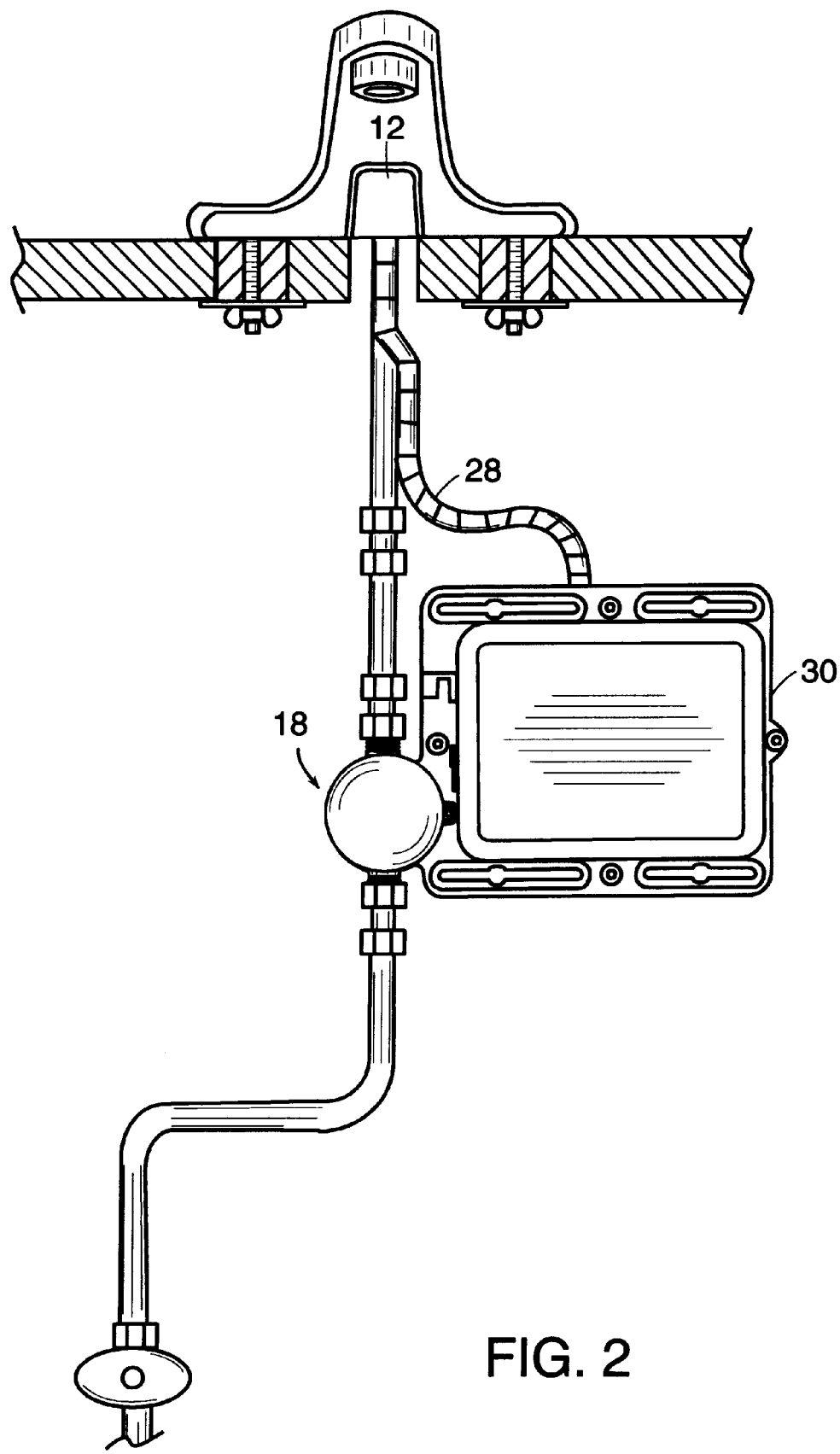
FIG. 2 is a side elevational view of the FIG. 1 system with the sink removed.

FIGS. 1 and 2 depict a typical installation in which the present invention's teachings can be employed. The infrared-radiation sensor assembly 12 to which a control circuit responds in controlling an automatic faucet 16's electromechanical valve 18 (FIG. 2) is located roughly the same distance away from the faucet's outlet 20 as it is from the lip 22 of a sink 24 that receives water flowing from the outlet. This relationship makes it impractical to use a sensor-range limitation as a way to avoid sensing the sink. So the system instead excludes the sink by so forming a sensor beam 26 that the sink's lip is not within it. Specifically, the beam is tilted upward by enough to avoid the sink lip, and its vertical extent is limited enough that the sensor does not thereby end up detecting the faucet. Yet the beam's horizontal extent is, say, at least 1.25 times its vertical extent so as to avoid excessive sensitivity to the target's horizontal position.

Figure 3:
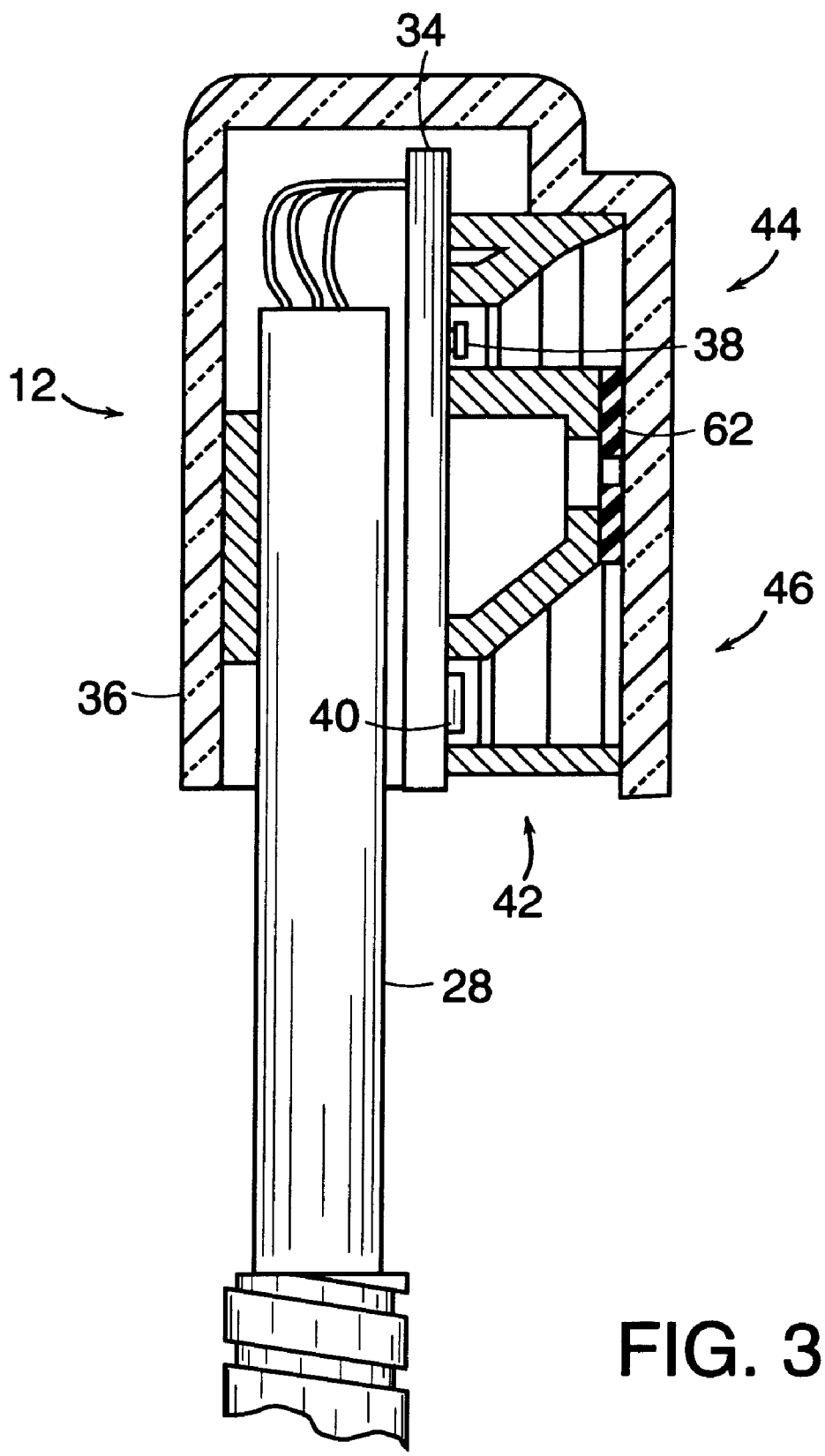
FIG. 3 is a side sectional view of that system's sensor assembly.

FIG. 2 shows that in the illustrated embodiment a cable 28 runs from the sensor assembly 12 to a remote part 30 of the control circuit, which is electrically connected to the valve 18's actuating solenoid. As FIG. 3 shows, cable 28 terminates in a small circuit board 34 mounted in the sensor assembly 12's infrared-transparent housing 36. The assembly's emitter, a light-emitting diode 38, is mounted on the circuit board, as is the assembly's receiver, a photodiode 40. The control circuit drives the emitter with electrical signals that cause the diode to emit an encoded infrared-light signal. The control circuit further includes a matching filter that receives the receiver's electrical output and tends to suppress signals that result from light not thus encoded. The control circuit bases its determination of whether a target is present on such received encoded signals, and it operates the valve on the basis of various predetermined target criteria.

Batteries (not shown) mounted in the remote part 30 power the illustrated embodiment's control circuit. For battery-powered versions, it is preferred for the valve to be of the latching variety, i.e., to be of the type that requires power to change state but not to remain in either state. This helps to extend battery life.

Figure 5:
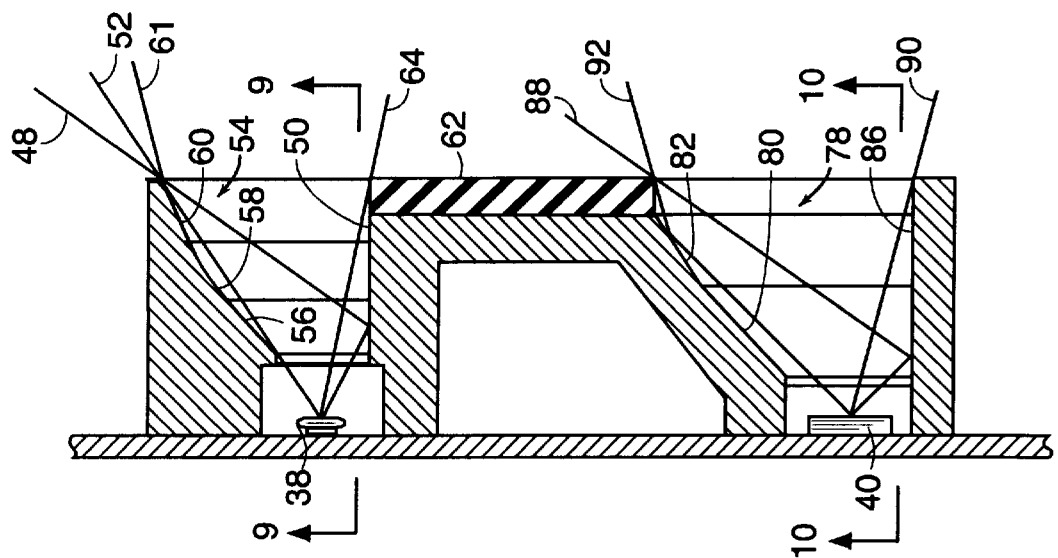
FIG. 5 is a cross-sectional view taken at line 5—5 of FIG. 4.
Figure 4:
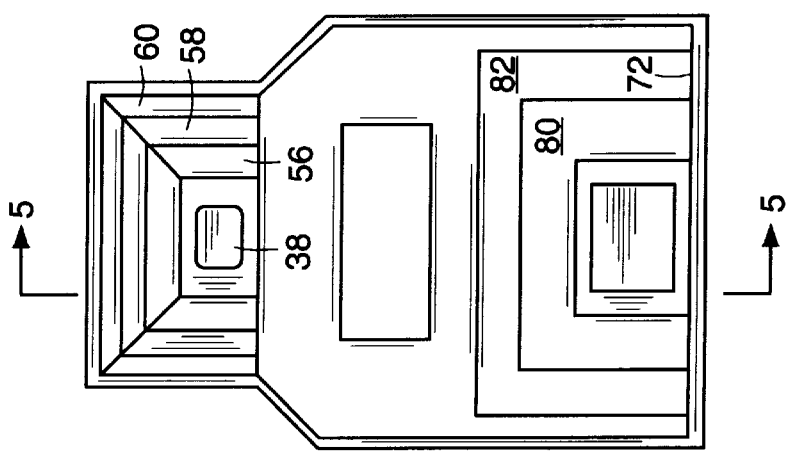
FIG. 4 is a front elevational view of that assembly's sensor body.

To form the beam, the assembly includes a reflector body 42 of chrome-plated plastic, which forms an emitter reflector 44 and a receiver reflector 46. FIG. 4 is a front elevation of the reflector body 42, while FIG. 5 is a cross-sectional view taken at line 5—5 of FIG. 4. FIG. 5 shows that the steepest path 48 of light from emitter 38 is caused by reflection from the emitter reflector 44's lower surface 50. Path 52 is the steepest direct path, but it is not as steep as path 48. FIGS. 3 and 4 together show that the emitter reflector 44's upper surface 54 is formed in three sections 56, 58, and 60, which form progressively shallower angles with the horizontal. These upper-surface sections redirect into shallower paths any radiation initially emitted at an angle steeper than that of path 52, as path 61 illustrates.

Although FIG. 3's infrared-transparent housing 36 is largely transparent to infrared radiation, its refractive index results in some reflection. To prevent repeated reflections between it and the reflector body 42 from resulting in emitter-receiver crosstalk, a black-foam absorber 62 is disposed between the emitter and receiver. As FIG. 5 shows, moreover, that absorber 62 and the lower reflector surface 50 intercept any radiation initially propagating at an angle below that of ray 64. The result is a vertical-plane radiation pattern that does not extend downward as far as it would in the reflectors' absence.

Figure 6:
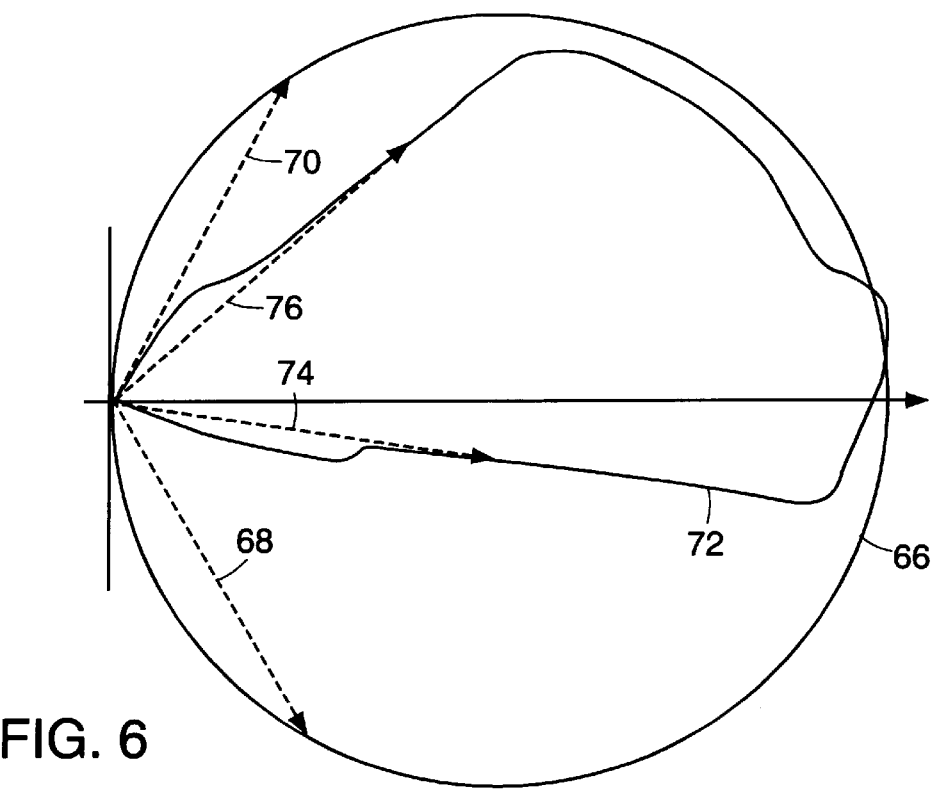
FIG. 6 is a graph of the sensor emitter's vertical-plane radiation patterns that result with and without the emitter assembly's reflector.

FIG. 6 shows that pattern. Plot 66 is an approximation of the radiation pattern that would result from the emitter alone, without the emitter assembly's reflector. If we define that pattern's lower extent as being delimited by its lower half-power point, then dashed line 68 represents the lower extent of the emitter-only pattern and shows that it extends significantly below the horizontal. Dashed line 70 defines the emitter-only beam's upper extent. But the emitter reflector redirects radiation into a more-central region, so the resultant radiation pattern 72's vertical extent is less, as dashed lines 74 and 76 show. In particular, the emitter assembly's downward extent is considerably less: the pattern does not extend significantly below the horizontal. Consequently, there is little reflection from the sink. (The peak intensity of the pattern that results from the reflector is actually greater than that of the emitter alone, but this is not apparent in the drawing, because plots 66 and 72 have been normalized by their respective peak values.)

FIG. 5's receiver reflector surfaces 80 and 82 so redirect received infrared radiation toward the receiver as to have an effect on the receiver assembly's radiation pattern similar to that which the emitter reflector surfaces 56, 58, and 60 have on the emitter assembly's pattern. Radiation path 88 is similar to path 48 in that it represents the steepest path, in this case to the receiver. Actually, that path is the steepest only to the center of the receiver; the receiver's sensitive region covers most of the aperture in which it is mounted, so a steeper path can reach the receiver's upper end. But only a small fraction of the receiver's sensitive surface can be reached from that angle. On the other hand, light directed toward the receiver at the angle of path 88 can illuminate half of the receiver's sensitive area.

Path 90 similarly defines the lowest angle to the receiver's center. Little light that approaches the receiver assembly at an angle lower than that of path 90 can reach the receiver assembly.

Figure 7:
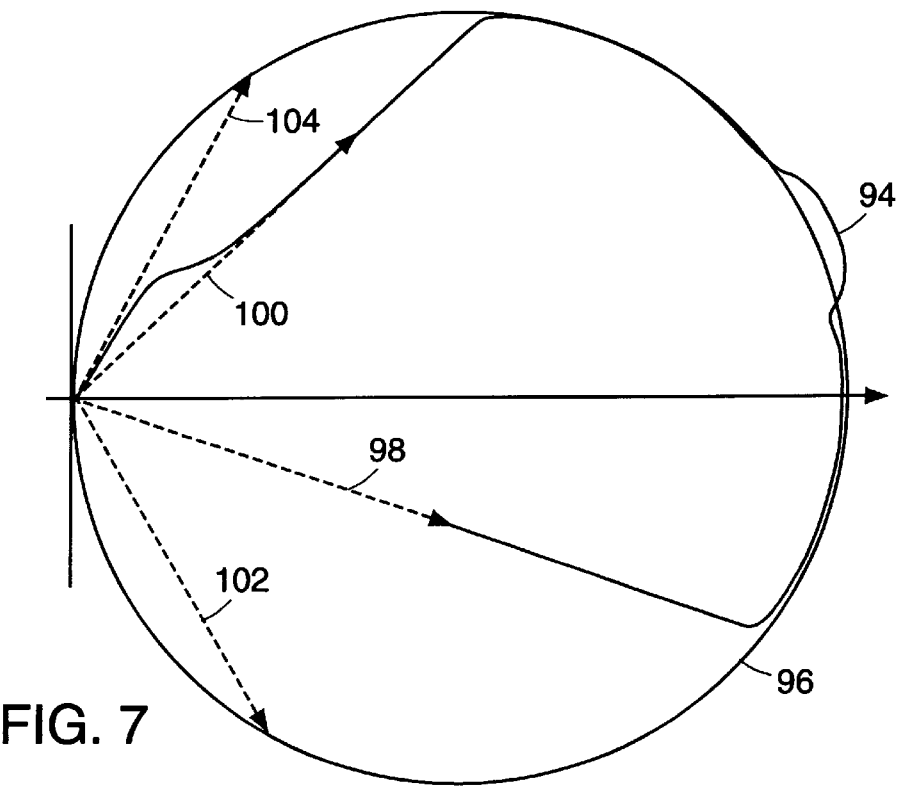
FIG. 7 is a similar graph of the sensor receiver's radiation patterns.

While the receiver reflector reduces the amount of light that reaches the receiver from wide angles, it increases the amount that reaches it from narrower angles. For instance, light propagating at the angle of path 92 can reach the receiver not only directly but also by the reflecting surfaces' redirecting it. So the receiver assembly's (normalized) radiation pattern is FIG. 7's pattern 94 rather than the pattern 96 of the receiver itself, and the extent of the receiver assembly's pattern 94, indicated by dashed lines 98 and 100, is considerably less than that of the receiver itself, which dashed lines 102 and 104 delimit. In particular, the receiver assembly's pattern extends much less below the horizontal than about it.

The overall sensor's far-field radiation pattern is the product of the emitter-assembly and receiver-assembly patterns. So the vertical-plane pattern that would result from combining those of the emitter and receiver themselves is FIG. 8's plot 106, which extends significantly below the horizontal. In contrast, the reflector's redirection of the radiation propagating from the emitter and toward the receiver so shapes the beam as to result in pattern 108, which does not. The radiation pattern's permissible extent below the horizontal will depend on the particular installation, of course, but the extent, if any, below the horizontal will ordinarily be no more than half the extent above the horizontal in embodiments of the present invention.

Figure 11:
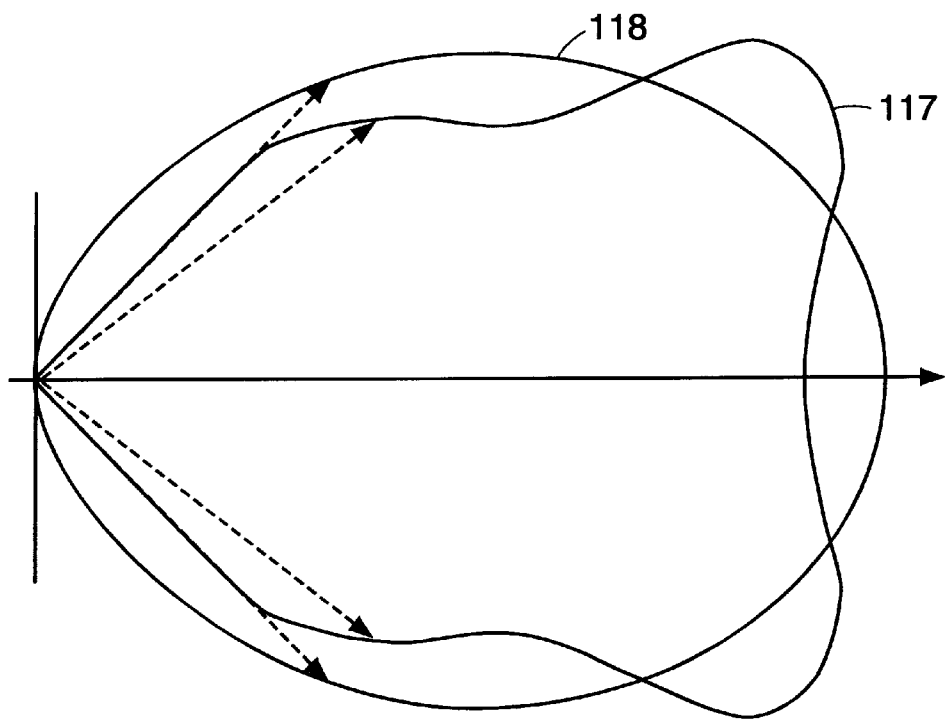
FIG. 11 is a graph of the combined emitter/receiver horizontal-plane radiation patterns that result with and without reflectors.
Figure 9:
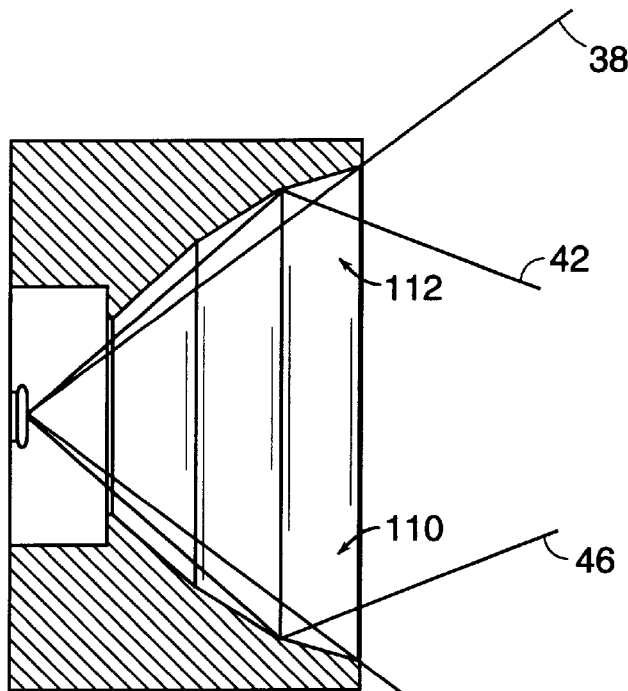
FIG. 9 is a cross-sectional view of the sensor's emitter assembly taken at line 9—9 of FIG. 5.
Figure 10:
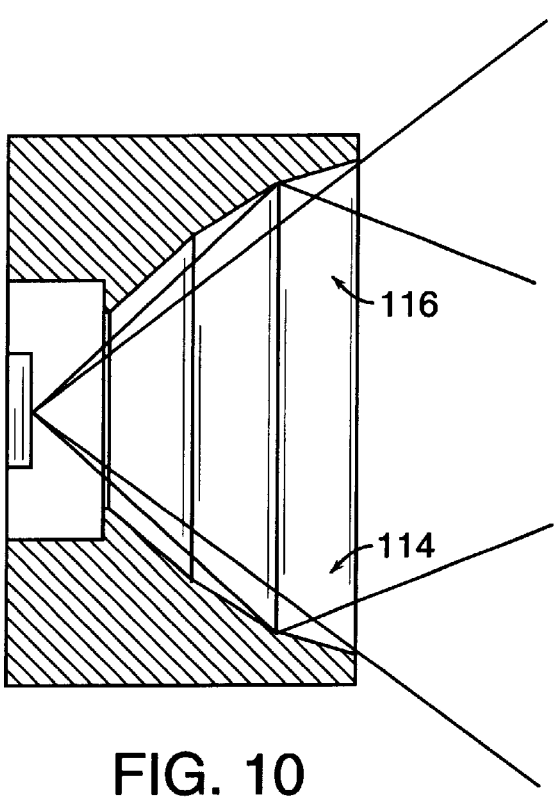
FIG. 10 is a cross-sectional view of the receiver assembly taken at line 10—10 of FIG. 5.

FIGS. 9 and 10 are cross-sectional views taken at lines 9—9 and 10—10 of FIG. 5. They show that the emitter reflector's left and right surfaces 110 and 112 consist of sections that form progressively shallower angles with the vertical plane normal to the printed-circuit board. The receiver reflector's left and right surfaces 114 and 116 are formed similarly, and inspection reveals that these surfaces so redirect infrared radiation as to narrow the beam in the horizontal direction, just as the top and bottom surfaces narrow it in the vertical direction. But those surfaces are so disposed and oriented as to result in a beam that extends horizontally farther than it does vertically, as FIG. 11's plot 117 of the horizontal-plane sensor beam illustrates.

Figure 8:
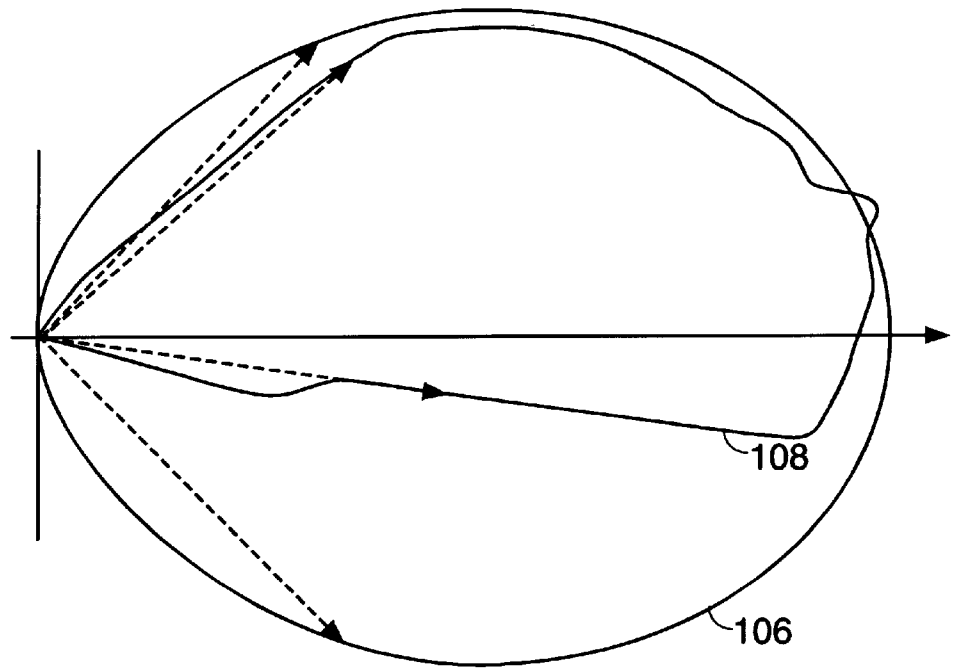
FIG. 8 is a graph of the combined emitter/receiver vertical-plane radiation patterns that result with and without reflectors.

In the horizontal plane, the radiation patterns of the emitter and receiver themselves, without the emitter and receiver assemblies' reflector surfaces, are the same as the vertical-plane emitter and receiver patterns 66 and 96 of FIGS. 5 and 6, so horizontal-plane far-field combination 118 (FIG. 11) is the same as FIG. 8's pattern 106. Therefore, the ratio of the sensor-beam pattern's horizontal extent to its vertical extent is greater than that of the pattern that results from the combination of the emitter-only and receiver-only patterns. In the drawings, the ratio of the beam's horizontal extent to its vertical extent is approximately 1.4. Of course, this is not a requirement. But we believe that a ratio of at least 1.25 is desirable for automatic faucets and similar installations.

Thus making the radiation pattern extend farther horizontally than it does vertically makes the system less sensitive to intended targets' positions than shaping the beam to avoid the sink would otherwise cause it to be.

Now, the goal of making the beam extend farther horizontally than vertically can also be achieved consistently with the present invention's teachings by using reflecting surfaces for only the receiver assembly or only the emitter assembly. So can the goal of restricting the radiation patterns to regions above the sink lip. But the sensor-assembly size for a given directivity can usually be smaller if reflecting surfaces are used for both.

Figure 12:
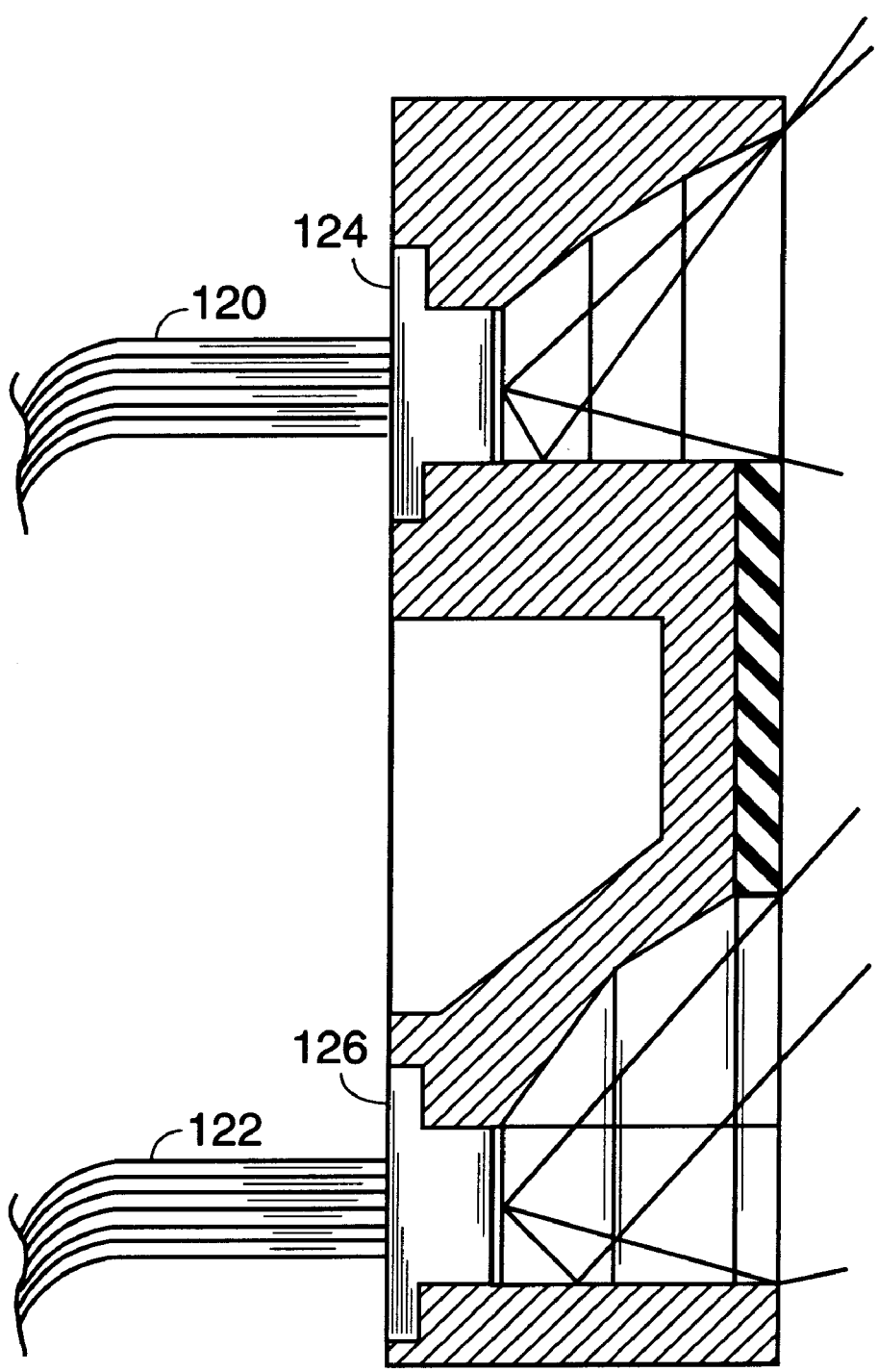
FIG. 12 is a cross-sectional view, similar to FIG. 5, of an alternative embodiment.

FIG. 12 is a cross-section similar to FIG. 5, but it depicts an alternative embodiment. The alternative embodiment is the same as the previously described embodiment, with the exception that the emitter and receiver include respective fiber-optic cables 120 and 122 that respectively lead from a remote light-emitting diode and photodiode, not shown, at the location of the remote control circuitry. Ferrules 124 and 126 secure polished ends of the fiber-optic cables into the emitter and receiver assemblies.

Despite this difference, the operation of the FIG. 12 embodiment is substantially the same as that of the previous embodiment. Because of the fiber-optic cables, the emitter's effective emitting area is significantly greater than in the previous embodiment. Also, the radiation patterns of the emitter and receiver themselves, i.e., the patterns that would result without the reflecting surfaces, are somewhat different, being largely determined by the numerical aperture of the interface between the air and the optic fibers' end surfaces. But the emitter and receiver reflectors still shape the beam. They make the ratio of its horizontal extent to its vertical extent greater than that of the emitter-receiver combination alone, and they so tilt the beam as to suppress the sensor's response to the sink.

By thus using reflective surfaces, an automatic flow-control system such as an automatic faucet can obtain the necessary directional selectivity without suffering the cost penalties that lens use can exact. At the same time, making the radiation pattern oblong increases the system's ease of use. The present invention therefore constitutes a significant advance in the art.

What is claimed is:

1. An object-sensor-based flow-control system comprising:
   A) a fluid conduit having an inlet and an outlet;
   B) an electromechanical valve interposed in the conduit and operable by application of control signals thereto to switch between an open state, in which it permits fluid flow through the conduit, and a closed state, in which it prevents fluid flow through the conduit;
   C) a sensor assembly including:
      i) an optical-radiation emitter operable by application of emitter signals thereto to emit optical radiation in an emitter radiation pattern;
      ii) an optical-radiation receiver that generates a receiver signal in accordance with a receiver radiation pattern in response to optical radiation received thereby; and
      iii) a sensor reflector so shaped and disposed with respect to the optical-radiation emitter and receiver as so to redirect optical radiation from the optical-radiation emitter and/or toward the optical-radiation receiver as to result in a sensor radiation pattern the greatest ratio of whose extents in orthogonal directions exceeds that of the combination of the emitter and receiver radiation patterns; and
   D) a control circuit that causes optical radiation to be sent into a target region by applying emitter signals to the optical-radiation emitter, receives resultant receiver signals from the optical-radiation receiver, and in accordance with the resultant receiver signals operates the electromechanical valve by applying control signals thereto.

2. An object-sensor-based flow-control system as defined in claim 1 wherein the sensor reflector includes an emitter reflector that forms an emitter assembly with the optical-radiation emitter and is so shaped and disposed with respect to the optical-radiation emitter as so to redirect optical radiation emitted by the optical-radiation emitter as to result in an emitter-assembly radiation pattern the greatest ratio of whose extents in orthogonal directions exceeds that of the emitter radiation pattern.

3. An object-sensor-based flow-control system as defined in claim 1 wherein the sensor reflector includes a receiver reflector that forms a receiver assembly with the optical-radiation receiver and is so shaped and disposed with respect to the optical-radiation receiver as so to redirect optical radiation toward the optical-radiation receiver as to result in a receiver-assembly pattern the greatest ratio of whose extents in orthogonal directions exceeds that of the receiver radiation pattern.

4. An object-sensor-based flow-control system as defined in claim 3 wherein the sensor reflector includes an emitter reflector that forms an emitter assembly with the optical-radiation emitter and is so shaped and disposed with respect to the optical-radiation emitter as so to redirect optical radiation emitted by the optical-radiation emitter as to result in an emitter-assembly radiation pattern the greatest ratio of whose extents in orthogonal directions exceeds that of the emitter radiation pattern.

5. An object-sensor-based flow-control system as defined in claim 1 wherein the optical-radiation emitter comprises:
   A) an optical-radiation source operable by application of the emitter signals thereto to generate the optical radiation that the optical-radiation emitter emits; and
   B) an elongated fiber-optic cable, having first and second ends, that receives the radiation from the optical-radiation source and emits from its second end the radiation thus received.

6. An object-sensor-based flow-control system as defined in claim 1 wherein the optical-radiation receiver comprises:
   A) an elongated fiber-optic cable, having first and second ends, that receives optical radiation at its second end and emits from its first end the optical radiation thus received; and.
   B) an optical-radiation detector that receives the optical radiation emitted from the fiber-optic cable's second end and generates the receiver signal in response.

7. An object-sensor-based flow-control system as defined in claim 6 wherein the optical-radiation emitter comprises:
   A) an optical-radiation source operable by application of the emitter signals thereto to generate the optical radiation that the optical-radiation emitter emits; and
   B) an elongated fiber-optic cable, having first and second ends, that receives the radiation from the optical-radiation source and emits from its second end the radiation thus received.

8. An object-sensor-based flow-control system as defined in claim 1 where in the valve is a latching valve, which requires power to change between its open and closed states but not to remain in either state.

9. An object-sensor-based flow-control system as defined in claim 8 further including a battery that powers the control circuit.

10. A faucet installation comprising:
   A) a sink;
   B) a fluid conduit having an outlet so positioned with respect to the sink that liquid flowing from the outlet falls into the sink;
   C) an electromechanical valve interposed in the conduit and operable by application of control signals thereto to switch between an open state, in which it permits fluid flow through the conduit, and a closed state, in which it prevents fluid flow through the conduit;
   D) a sensor assembly including:
      i) an emitter assembly operable by application of emitter signals thereto to emit optical radiation in an emitter-assembly radiation pattern; and
      ii) a receiver assembly that generates, in response to optical radiation received thereby, a receiver signal in accordance with a receiver-assembly radiation pattern that combined with the emitter-assembly radiation pattern forms a sensor radiation pattern whose horizontal extent is at least 1.25 times its vertical extent; and
   E) a control circuit that causes optical radiation to be sent into a target region by applying emitter signals to the optical-radiation emitter, receives resultant receiver signals from the optical-radiation receiver, and in accordance with the resultant receiver signals operates the electromechanical valve by applying control signals thereto.

11. A faucet installation as defined in claim 10 wherein:
A) the emitter assembly includes an optical-radiation emitter operable by application of emitter signals thereto to emit optical radiation in an emitter radiation pattern;
B) the receiver assembly includes an optical-radiation receiver that generates a receiver signal in accordance with a receiver radiation pattern in response to optical radiation received thereby; and
C) the sensor assembly includes a sensor reflector so shaped and disposed with respect to the optical-radiation emitter and receiver as so to redirect optical radiation from the optical-radiation emitter and/or toward the optical-radiation receiver as to result in the sensor radiation pattern, the ratio of whose horizontal to vertical extents exceeds that of the combination of the emitter and receiver radiation patterns.

12. A faucet installation as defined in claim 11 wherein the sensor reflector includes an emitter reflector that forms the emitter assembly with the optical-radiation emitter and is so shaped and disposed with respect to the optical-radiation emitter as so to redirect optical radiation emitted by the optical-radiation emitter as to result in an emitter-assembly radiation pattern the ratio of whose horizontal to vertical extents exceeds that of the emitter radiation pattern.

13. A faucet installation as defined in claim 11 wherein the sensor reflector includes a receiver reflector that forms the receiver assembly with the optical-radiation receiver and is so shaped and disposed with respect to the optical-radiation receiver as so to redirect optical radiation toward the optical-radiation receiver as to result in a receiver-assembly s radiation pattern the ratio of whose horizontal to vertical extents exceeds that of the receiver radiation pattern.

14. A faucet installation as defined in claim 13 wherein the sensor reflector includes an emitter reflector that forms the emitter assembly with the optical-radiation emitter and is so shaped and disposed with respect to the optical-radiation emitter as so to redirect optical radiation emitted by the optical-radiation emitter as to result in an emitter-assembly radiation pattern the ratio of whose horizontal to vertical extents exceeds that of the emitter radiation pattern.

15. A faucet installation as defined in claim 10 wherein the emitter assembly includes an optical-radiation emitter that comprises:
A) an optical-radiation source operable by application of the emitter signals thereto to generate the optical radiation that the optical-radiation emitter emits; and
B) an elongated fiber-optic cable, having first and second ends, that receives the radiation from the optical-radiation source and emits from its second end the radiation thus received.

16. A faucet installation as defined in claim 10 wherein the receiver assembly includes an optical-radiation receiver that comprises:
A) an elongated fiber-optic cable, having first and second ends, that receives optical radiation at its second end and emits from its first end the optical radiation thus received; and.
B) an optical-radiation detector that receives the optical radiation emitted from the fiber-optic cable's second end and generates the receiver signal in response.

17. A faucet installation as defined in claim 16 wherein the optical-radiation emitter comprises:
A) an optical-radiation source operable by application of the emitter signals thereto to generate the optical radiation that the optical-radiation emitter emits; and
B) an elongated fiber-optic cable, having first and second ends, that receives the radiation from the optical-radiation source and emits from its second end the radiation thus received.

18. A faucet installation as defined in claim 10 wherein the sensor radiation pattern's extent above the horizontal is at least twice its extent below the horizontal.

19. A faucet installation as defined in claim 10 wherein the valve is a latching valve, which requires power to change between its open and closed states but not to remain in either state.

20. A faucet installation as defined in claim 19 further including a battery that powers the control circuit.

21. A faucet installation comprising:
A) a sink;
B) a fluid conduit having an outlet so positioned with respect to the sink that liquid flowing from the outlet falls into the sink;
C) an electromechanical valve interposed in the conduit and operable by application of control signals thereto to switch between an open state, in which it permits fluid flow through the conduit, and a closed state, in which it prevents fluid flow through the conduit;
D) a sensor assembly including:
 i) an emitter assembly operable by application of emitter signals thereto to emit optical radiation in an emitter-assembly radiation pattern; and
 ii) a receiver assembly that generates, in response to optical radiation received thereby, a receiver signal in accordance with a receiver-assembly radiation pattern that combined with the emitter-assembly radiation pattern forms a sensor radiation pattern whose extent above the horizontal is at least twice its extent below the horizontal; and
E) a control circuit that causes optical radiation to be sent into a target region by applying emitter signals to the optical-radiation emitter, receives resultant receiver signals from the optical-radiation receiver, and in accordance with the resultant receiver signals operates the electromechanical valve by applying control signals thereto.

22. A faucet installation as defined in claim 21 wherein:
A) the emitter assembly includes an optical-radiation emitter operable by application of emitter signals thereto to emit optical radiation in an emitter radiation pattern;
B) the receiver assembly includes an optical-radiation receiver that generates a receiver signal in accordance with a receiver radiation pattern in response to optical radiation received thereby; and
C) the sensor assembly includes a sensor reflector so shaped and disposed with respect to the optical-radiation emitter and receiver as so to redirect optical radiation from the optical-radiation emitter and/or toward the optical-radiation receiver as to result in the sensor radiation pattern, the ratio of whose extent above the horizontal to its extent below the horizontal exceeds that of the combination of the emitter and receiver radiation patterns.

23. A faucet installation as defined in claim 22 wherein the sensor assembly includes an emitter reflector that forms the emitter assembly with the optical-radiation emitter and is so shaped and disposed with respect to the optical-radiation emitter as so to redirect optical radiation emitted by the optical-radiation emitter as to result in an emitter-assembly radiation pattern the ratio of whose extent above the horizontal to its extent below the horizontal exceeds that of the emitter radiation pattern.

24. A faucet installation as defined in claim 22 wherein the sensor reflector includes a receiver reflector that forms the receiver assembly with the optical-radiation receiver and is so shaped and disposed with respect to the optical-radiation receiver as so to redirect optical radiation toward the optical-radiation receiver as to result in a receiver-assembly radiation pattern the ratio of whose extent above the horizontal to its extent below the horizontal exceeds that of the receiver radiation pattern.

25. A faucet installation as defined in claim 24 wherein the sensor reflector includes an emitter reflector that forms the emitter assembly with the optical-radiation emitter and is so shaped and disposed with respect to the optical-radiation emitter as so to redirect optical radiation emitted by the optical-radiation emitter as to result in an emitter-assembly radiation pattern the ratio of whose extent above the horizontal to its extent below the horizontal exceeds that of the emitter radiation pattern.

26. A faucet installation as defined in claim 21 wherein the emitter assembly includes an optical-radiation emitter that comprises:
   A) an optical-radiation source operable by application of the emitter signals thereto to generate the optical radiation that the optical-radiation emitter emits; and
   B) an elongated fiber-optic cable, having first and second ends, that receives the radiation from the optical-radiation source and emits from its second end the radiation thus received.

27. A faucet installation as defined in claim 21 wherein the receiver assembly includes an optical-radiation receiver that comprises:
   A) an elongated fiber-optic cable, having first and second ends, that receives optical radiation at its second end and emits from its first end the optical radiation thus received; and
   B) an optical-radiation detector that receives the optical radiation emitted from the fiber-optic cable's second end and generates the receiver signal in response.

28. A faucet installation as defined in claim 27 wherein the optical-radiation emitter comprises:
   A) an optical-radiation source operable by application of the emitter signals thereto to generate the optical radiation that the optical-radiation emitter emits; and an elongated fiber-optic cable, having first and second ends, that receives the radiation from the optical-radiation source and emits from its second end the radiation thus received.

29. A faucet installation as defined in claim 21 wherein the valve is a latching valve, which requires power to change between its open and closed states but not to remain in either state.

30. A faucet installation as defined in claim 21 further including a battery that powers the control circuit.

* * * * *